(12) United States Patent
Galazin et al.

(10) Patent No.: US 10,894,457 B2
(45) Date of Patent: Jan. 19, 2021

(54) HOLDING MOUNT

(71) Applicant: SAF-HOLLAND GmbH, Bessenbach (DE)

(72) Inventors: Gregory Galazin, Muskegon, MI (US); Edward Hammer, Muskegon, MI (US)

(73) Assignee: SAF-Holland GmbH, Bessenbach (DE)

( * ) Notice: Subject to any disclaimer, the term of this patent is extended or adjusted under 35 U.S.C. 154(b) by 150 days.

(21) Appl. No.: 16/301,350

(22) PCT Filed: Mar. 23, 2017

(86) PCT No.: PCT/EP2017/056947
§ 371 (c)(1),
(2) Date: Nov. 13, 2018

(87) PCT Pub. No.: WO2017/198374
PCT Pub. Date: Nov. 23, 2017

(65) Prior Publication Data
US 2019/0193502 A1    Jun. 27, 2019

(30) Foreign Application Priority Data

May 19, 2016  (DE) .......................... 10 2016 109 184

(51) Int. Cl.
*B60G 7/02* (2006.01)
*B60G 11/10* (2006.01)
*B60G 9/00* (2006.01)

(52) U.S. Cl.
CPC .............. *B60G 7/02* (2013.01); *B60G 9/003* (2013.01); *B60G 11/10* (2013.01);
(Continued)

(58) Field of Classification Search
CPC .. B60G 7/02; B60G 2206/8601; B60G 11/10; B60G 2204/143; B60G 9/003; B60G 2206/601
See application file for complete search history.

(56) References Cited

U.S. PATENT DOCUMENTS 6,659,479 B1   12/2003  Raidel, II et al.
9,315,222 B1   4/2016   Wetter et al.
(Continued)

FOREIGN PATENT DOCUMENTS

DE   20011858   9/2000
DE   20104753   6/2001
(Continued)

OTHER PUBLICATIONS

Helmut Hock, Retaining device for an axle element, May 7, 2008, EPO, EP 1 918 135 A2, Machine Translation of Description (Year: 2008).*

(Continued)

*Primary Examiner* — James A English
(74) *Attorney, Agent, or Firm* — Price Heneveld LLP

(57) ABSTRACT

A holding mount for a commercial vehicle trailer includes two side walls which extend along a vertical axis and which form an arrangement region for arranging the holding mount on a load-bearing element, the holding mount further including an insert part which has a connecting section and a reinforcing section, the connecting section forming the arrangement region, and the reinforcing section extending between the side walls along the vertical axis for the reinforcement purposes.

17 Claims, 2 Drawing Sheets

(52) U.S. Cl.
CPC .... *B60G 2200/31* (2013.01); *B60G 2204/143* (2013.01); *B60G 2206/601* (2013.01); *B60G 2206/722* (2013.01); *B60G 2206/8103* (2013.01); *B60G 2206/8201* (2013.01); *B60G 2300/04* (2013.01)

(56) References Cited

U.S. PATENT DOCUMENTS

| | | | | |
|---|---|---|---|---|
| 2007/0126263 | A1* | 6/2007 | Ramsey | B60G 7/02 296/203.01 |
| 2016/0075202 | A1* | 3/2016 | Galazin | B60G 9/003 280/124.125 |
| 2017/0166024 | A1* | 6/2017 | Andreasen | F16B 39/28 |
| 2017/0259638 | A1* | 9/2017 | Jansen | B60G 3/145 |
| 2018/0370311 | A1* | 12/2018 | Lin | B62D 21/20 |

FOREIGN PATENT DOCUMENTS

| | | |
|---|---|---|
| DE | 10308347 | 9/2004 |
| DE | 60110695 | 1/2006 |
| DE | 60114386 T2 | 7/2006 |
| DE | 102005017031 | 10/2006 |
| DE | 102010024593 | 2/2011 |
| EP | 1728654 | 12/2006 |
| EP | 1911661 | 4/2008 |
| EP | 1918135 | 5/2008 |

OTHER PUBLICATIONS

Heins et al., Retaining support for connecting chassis component and carrying structure of vehicle, has fastening units provided such that connection section and flange are fastened together, Feb. 3, 2011, EPO, DE10 2010 024 593 A1, Machine Translation of Description (Year: 2011).*

European Patent Office; International Search Report; dated May 30, 2017.

* cited by examiner

HOLDING MOUNT

BACKGROUND OF THE INVENTION

The present invention relates to a holding mount, in particular of or for a commercial vehicle trailer, to a holding system and to a mounting plate.

Holding mounts of the type addressed here are used, in particular, to mount chassis components. To this end, the holding mounts are fastened to a load-bearing structure, for example a commercial vehicle frame, said holding mounts having openings or bearing points, in order, for example, to rotatably mount a longitudinal link and/or to arrange a spring or shock absorber element, etc. The known holding mounts entail the disadvantage that they are either very heavy, which reduces the available payload of the vehicles, or secondly do not have the required rigidity/strength.

It is therefore an object of the present invention to specify a holding mount, a holding system and a mounting plate which eliminate the abovementioned disadvantages and, with a low build-up of material, make a very rigid fastening or attachment of chassis components to a load-bearing structure possible.

SUMMARY OF THE INVENTION

According to the invention, a holding mount, in particular of or for a commercial vehicle trailer, comprises two side walls which extend along a vertical axis and which form an arrangement region, for arranging the holding mount on a load-bearing element, the holding mount comprising an insert part which has a connecting section and a reinforcing section, the connecting section also forming the arrangement region, and the reinforcing section extending between the side walls for the reinforcement purposes. Here, the reinforcing section can extend substantially along or parallel to the vertical axis or can be inclined with respect to the latter, an angle of inclination of up to 30°, preferably of up to 15° and particularly preferably of up to 5° being preferred. In accordance with different embodiments, the load-bearing element can be a frame structure or a part of a frame structure of a vehicle, in particular of a commercial vehicle trailer. As an alternative, however, the load-bearing element can also be a mounting plate which for its part is arranged again on a frame structure of a vehicle. In one preferred embodiment, the load-bearing element is a mounting plate, in particular made from steel, which is fastened, in particular screwed, to a frame structure or to a part of the frame structure, for example a frame of a commercial vehicle trailer. The frame of the trailer, comprising at least one longitudinal carrier, is preferably manufactured from aluminum. In the installed state of the holding mount, the abovementioned vertical axis lies substantially perpendicularly with respect to a roadway plane or to a surface extent of the load-bearing element. In one preferred embodiment, the two side walls are connected via a transverse wall. The holding mount is preferably manufactured by way of a forming method, in particular by way of bending of an initially plate-shaped component. The arrangement region provides the actual connecting point between the holding mount and the load-bearing element, a part of the arrangement region particularly advantageously also being formed by way of the insert part, that is to say also forming or configuring it. At the same time, the insert part advantageously fulfills a reinforcing function, by extending between the side walls along or in an inclined manner with respect to the vertical axis, said insert part bearing against the side walls and supporting the latter, in particular even with respect to one another, as a result of which buckling, folding or collapsing of the holding mount in the case of loading is prevented. Here, "along the vertical axis" does not mean or specify a specific direction. The reinforcing section can extend substantially parallel to or else obliquely or in an inclined manner with respect to the vertical axis, very generally substantially in the direction of a lower end of the holding mount. The reinforcing section therefore advantageously connects the side walls, whereas the connecting section forms an arrangement region with a contour which is preferably circumferentially closed. Said closed contour makes (in particular, circumferential) welding of the holding mount to the load-bearing element possible. Offsetting therefore does not have to be carried out during welding and no edges or steps have to be welded. The welding operation can, as it were, be performed in one step or "seamlessly". The insert part is also advantageously at the same time fixed relative to the holding mount during the welding of the holding mount to the load-bearing element by way of the configuration of the holding mount, comprising the insert part which has the connecting section and also forms the arrangement region. In one work step, the two components can therefore be fastened. The reinforcing section which extends within the side walls can likewise be welded, but it can also merely bear on the inside against the side walls in a positively locking manner. The insert part is preferably configured from steel, like the holding mount per se. It is particularly advantageous to configure the insert part as an element which is separate from the side walls. In other words, the insert part and the side walls are manufactured separately, it then being possible for them to be connected to one another, in particular to be connected in an integrally joined and/or non-positive and/or positively locking manner.

The connecting section of the insert part expediently has an inner section which extends between the side walls in the arrangement region. The connecting section therefore connects the side walls directly to one another and to this end bears against the inner faces of the side walls. It therefore reinforces, in particular, the arrangement region of the holding mount.

In accordance with one embodiment, the connecting section has an outer section which bears against the side walls in the arrangement region, in particular so as to close an outer contour of the side walls. The outer section therefore does not bear against the inner faces of the side walls, but rather against the edges or edge faces of the side walls. As has been mentioned, an outer contour of the side walls can be continued, in particular in the arrangement region, by way of said refinement. By way of the outer section, the arrangement region or a length of the arrangement region can be enlarged, which contributes to an additional reinforcement of the overall arrangement. Moreover, the continuation of the contour reinforces the welded connection, since, for example, the outer section preferably has a substantially semicircular structure, in order to close or to connect the side walls uniformly.

The outer section and the inner section of the insert part are expediently connected above the shoulder, a size of the shoulder corresponding substantially to a wall thickness of the side wall or walls. The connecting section is therefore expediently connected to the side walls in a positively locking manner, as a result of which locking and pre-positioning of the insert part relative to the holding mount are made possible. The addressed locking and pre-positioning are also achieved, in particular, by virtue of the fact that the insert part has a wall thickness which is greater than a wall thickness of the side walls, a ratio of a wall thickness of the side walls to a wall thickness of the insert part lying in a range of approximately from 0.4 to 0.8, preferably in a range of approximately from 0.5 to 0.7. The relatively great wall thickness of the insert part expediently of course also contributes to a greater strength and/or rigidity of the overall holding mount.

In accordance with one preferred embodiment, the reinforcing section extends substantially parallel to the vertical axis, the connecting section extending substantially perpendicularly with respect thereto. The reinforcing section and the connecting section preferably therefore have substantially a 90° angle with respect to one another. As an alternative, however, the angle can also be greater or smaller than 90°, for example in a range of approximately from 80° to 130°, preferably from 85 to 100°.

A length of the holding mount is measured along the driving direction in the installed state. As a rule, a length of the arrangement region corresponds approximately to a length of the holding mount. In preferred embodiments, a ratio of a length of the connecting section to a length of the arrangement region lies in a range of approximately from 0.1 to 0.5, expediently in a range of approximately from 0.2 to 0.3. A ratio of a length of the reinforcing section (parallel to the vertical axis) to a length of the connecting section (perpendicularly with respect to the vertical axis) lies in preferred embodiments at approximately from 1.1 to 1.3.

In accordance with one preferred embodiment, the holding mount widens along the vertical axis away from the arrangement region, the reinforcing section preferably extending into the widened region. A ratio of the width of the tapered region to the width of the widened region expediently lies at approximately from 0.5 to 0.95, preferably from 0.7 to 0.9. The tapering in the direction of the arrangement region entails the advantage that material can be saved as a result. Moreover, a very rigid structure is provided and it is made possible to fasten a holding mount of this type even to very narrow (longitudinal) carriers. The fact that the reinforcing section extends as far as into the widened region entails the advantage that firstly the widened region is also reinforced and secondly precisely said transition zone is also reinforced. It has thus been shown that compressions or buckling of components can occur precisely in the region of (cross-sectional) transitions of this type. It is therefore particularly advantageous that the insert part contributes to a reinforcement of the holding mount even in said region.

In accordance with one preferred embodiment, a ratio of a width of the tapered region to the widened region lies at approximately from 0.7 to 0.9. Said values represent an ideal compromise between as low a material use as possible, with at the same time as high a rigidity as possible.

A fastening opening for a chassis component is expediently arranged below the inner section of the insert part. The region below the inner section is extremely rigid and provides a very rigid attaching possibility for chassis components, such as a spring element. Further fastening openings for arranging chassis components, such as a longitudinal carrier, are advantageously provided in the holding mount. For example, a bearing point, in the form of a corresponding opening or bore, is preferably arranged, in particular, in the widened region, which bearing point serves to mount a longitudinal link. On account of its dimensions, the widened region also provides the necessary bearing width.

The insert part expediently has at least one recess or opening, as a result of which it is brought about advantageously that further weight can be saved. Recesses or openings of this type can be, for example, oval, round, in particular circular, or else polygonal. Recesses of this type are expediently provided in the connecting section and/or in the reinforcing section.

The invention is also directed to a holding system, comprising a holding mount which comprises two side walls which extend substantially along or in an inclined manner with respect to a vertical axis, and which form or configure an arrangement region which is arranged on a load-bearing element, the holding mount comprising an insert part which has a connecting section and a reinforcing section, the connecting section also forming or configuring the arrangement region, and the reinforcing section extending between the side walls along the vertical axis for the reinforcement purposes.

Further advantages and features of the holding mount according to the invention and its preferred embodiments can likewise be used in the holding system according to the invention.

In accordance with different embodiments, the load-bearing element is a frame structure or a part of a frame structure of a vehicle, in particular a commercial vehicle trailer, or a mounting plate. In accordance with one preferred embodiment, the load-bearing element is a mounting plate, in particular made from a steel material. The holding mount is likewise preferably made from a steel material. The mounting plate advantageously comprises corresponding fastening openings for the positively locking and/or non-positive connection, in particular, for example, for screwing, to the frame, for example of the commercial vehicle trailer. In one preferred embodiment, the said frame is manufactured from aluminum, whereas the mounting plate and the holding mount are manufactured from steel. The mounting plate and the holding mount are expediently connected via the arrangement region in an integrally joined manner, in particular via a welding method. The mounting plate is in turn advantageously screwed to the frame.

In one preferred embodiment, the load-bearing element, in particular therefore the mounting plate, has a mounting opening, within which or on which the holding mount or its arrangement region is welded.

The mounting opening particularly preferably has a web or collar, the holding mount or the arrangement region being arranged or fastened within the web or the collar. The mounting opening entails the advantage that the weight of the mounting plate can be reduced as a result. In addition to an optimum welding surface, the web or collar in turn entails the advantage that the mounting plate per se and, moreover, the arrangement of the holding mount relative to the mounting plate are reinforced.

A circumferential, closed gap is particularly preferably formed between the web or collar and the arrangement region. Said gap is highly suitable as a welding zone, since, as has been mentioned, it is circumferential and, as a result of its geometry, provides a sufficiently great area for connecting the different joint partners. The holding mount is particularly preferably welded onto the mounting plate from above. As an alternative or in addition, the holding mount can also be welded onto the mounting plate from below.

Finally, the invention also relates to a mounting plate, comprising a mounting opening, for arranging a holding mount, in particular a holding mount according to the invention, the mounting opening being reinforced, in particular by way of a web or collar. If the reinforcement is configured as a web or collar, this also entails the advantage that space or a place for the welded seam is provided. The web or collar is expediently configured in such a way that it extends in the direction of the holding mount which is to be arranged or is arranged. In preferred embodiments, the web or collar assumes, for example, a height of approximately from 3 to 10 mm.

BRIEF DESCRIPTION OF THE DRAWINGS

Further advantages and features result from the following description of one preferred embodiment of the holding mount, the holding system and the mounting plate with reference to the appended figures, in which.

DETAILED DESCRIPTION OF THE PREFERRED EMBODIMENTS

Figure 1:
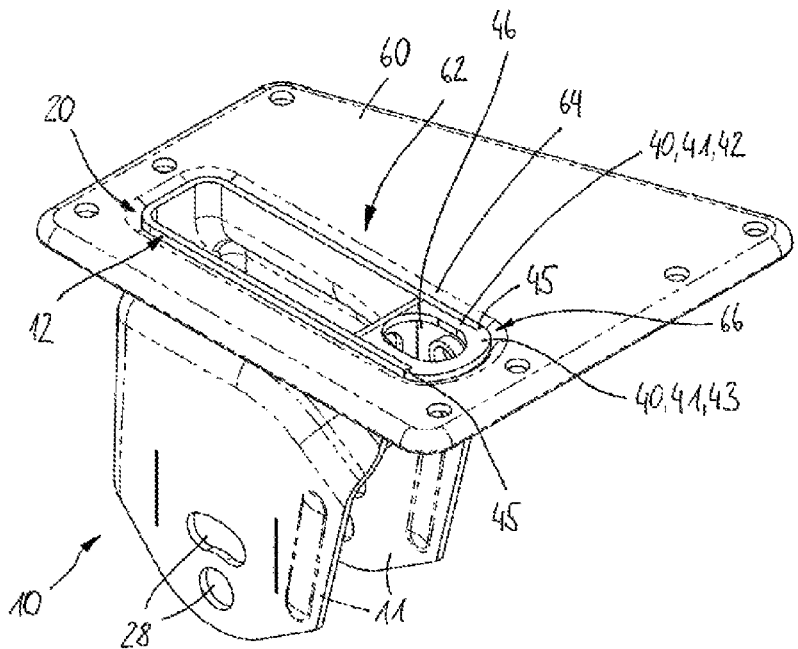
FIG. 1: shows a perspective illustration of one embodiment of a holding mount.

FIG. 1 shows a perspective illustration (obliquely from above) of a holding system, comprising a holding mount 10 which comprises two side walls 11, and a load-bearing element 60. The side walls 11 comprise a very wide variety of fastening openings 28 which serve, for example, to mount a longitudinal link (not shown here). The holding mount 10 is connected via an arrangement region 20 to the load-bearing element 60 which is a mounting plate 60 in the embodiment which is shown here. An insert part 40 can be seen in the region of the arrangement region 20, which insert part 40 also forms the arrangement region 20. In particular, a connecting section 41, an inner section 42 and an outer section 43 can be seen. It becomes clear, in particular, that an outer contour 12 of the side walls 11 is continued by way of the outer section 43 of the insert part 40, with the result that a circumferential gap 66 is formed in interaction with a web/collar 64 of the mounting plate 60, which circumferential gap 66 is ideally suitable for welding the holding mount 10 to the mounting plate 60, since firstly a great welding area is provided and secondly a welded seam of this type is ideally embedded into the entire construction/structure. It is also to be mentioned with regard to the insert part 40 that its inner section 42 and its outer section 43 are advantageously connected via a shoulder 45 which corresponds approximately to a wall thickness of the side walls 11. Ideal positioning of the insert part 40 within the side walls 11 is made possible by way of said structure. The mounting plate 60 is also provided with fastening openings (not designated in further detail) which expediently serve to arrange the holding system, comprising the mounting plate 60 and the holding mount 10, on a frame (not shown here), for example a longitudinal carrier of a commercial vehicle trailer.

Figure 2:
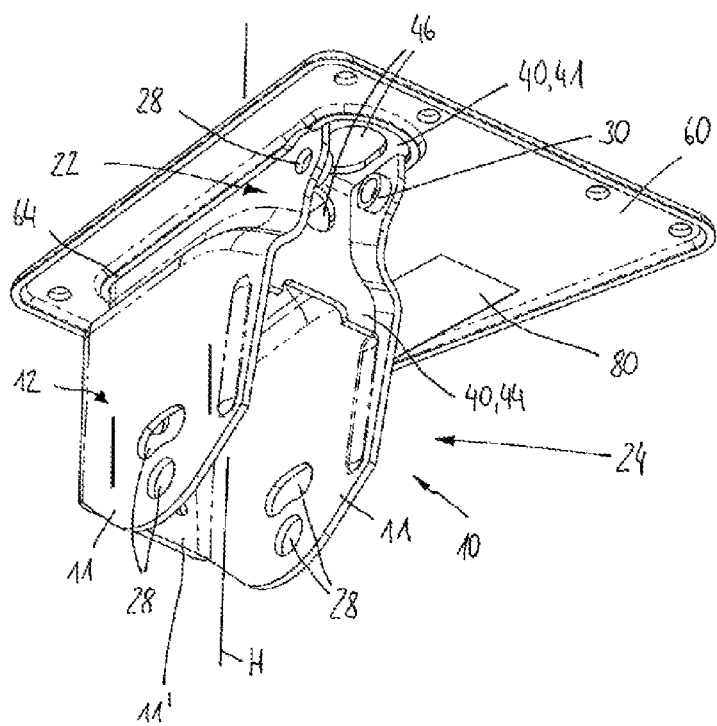
FIG. 2: shows a further perspective illustration of that embodiment of the holding mount which is known from FIG. 1.

FIG. 2 shows the holding system which is known from FIG. 1 from another perspective, namely substantially obliquely from below, a vertical axis being denoted by the designation H. It can be seen in said perspective that the two side walls 11 are connected via a transverse wall 11'. It can be seen clearly, moreover, that the holding mount 10 comprises a tapered region 22 and a widened region 24. In addition to the already known connecting section 41, the insert part 40 comprises a reinforcing section 44 which extends substantially perpendicularly with respect to said connecting section 41 and advantageously extends as far as into the widened region 24 in the embodiment which is shown here. In particular, the transition region between the tapered region 22 and the widened region 24 is also reinforced by way of the reinforcing section 44. In said perspective, the web or collar 64 can also be seen more clearly, which web or collar 64 advantageously forms the gap 66 which is shown in FIG. 1. It has been mentioned in conjunction with FIG. 1 that the welding expediently takes place from above. As an alternative or in addition, the welding of the holding mount 10 can also take place from below, for example on the underside of the web/collar 64. It can also be seen in said perspective that the holding mount 10 is supported laterally via a strut 80, said support taking place here relative to the mounting plate 60. The strut might also, however, be attached to the frame or to another part of the vehicle. Below the connecting section 41, the tapered region 22 has a fastening opening 28 which is additionally provided with a fastening collar 30 in the embodiment which is shown here. For further weight saving, the insert part 40 has two recesses or openings 46.

Figure 3:
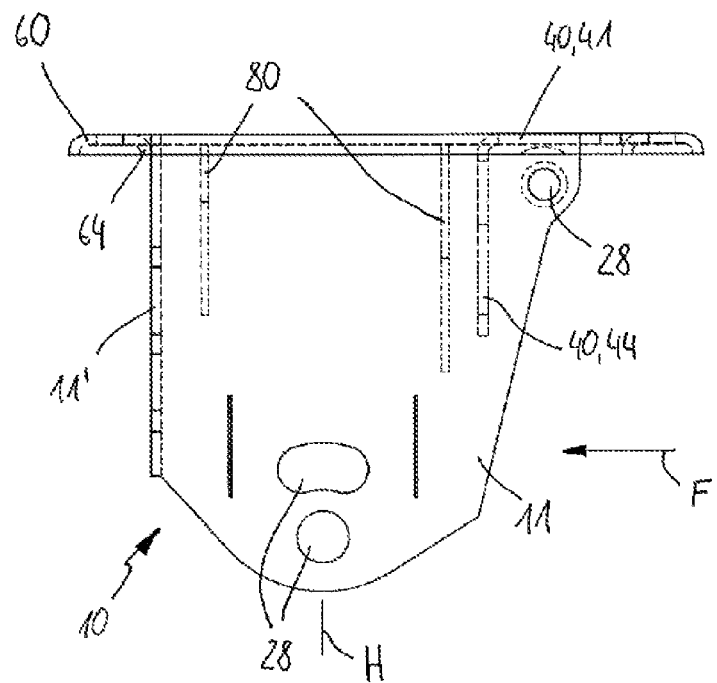
FIG. 3: shows a side view of that embodiment of the holding mount which is known from FIG. 1.

FIG. 3 shows that embodiment of a holding system which is known from FIGS. 1 and 2 in a side view. Here, in particular, the substantially right-angled structure of the insert part 40 can be seen, comprising the connecting section 41 and the reinforcing section 44. The course of the strut 80 which comprises two carriers in the embodiment which is shown here is indicated using dashed lines. Furthermore, the refinement of the collar or web 64 which extends in the direction of the holding mount 10 can be seen. The designation F denotes a driving direction. In the installed state of the holding mount 10, for example, a longitudinal carrier would extend to the right.

Figure 4:
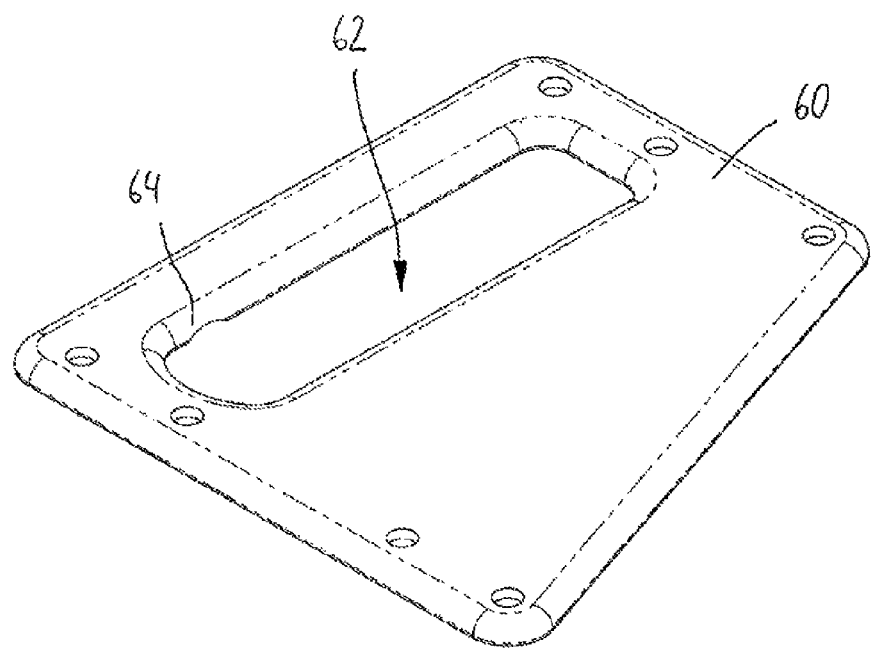
FIG. 4: shows a perspective illustration of one embodiment of a mounting plate.

FIG. 4 shows a plan view of one preferred embodiment of a mounting plate 60, comprising a mounting opening 62 which is provided with a web or collar 64. Said web or collar 64 can be manufactured, for example, by way of a forming manufacturing method. On its edges, the mounting plate 60 has various openings or bores which serve to fasten the mounting plate 60, for example to a vehicle frame or a longitudinal carrier. The mounting plate 60 is preferably manufactured from steel; the provision of the mounting opening 62 is to be mentioned as being advantageous, in particular, since it decisively contributes to the weight reduction of the mounting plate 60. At the same time, the rigidity of the mounting plate 60 is increased significantly by way of the provision of the web or collar 64.

LIST OF DESIGNATIONS

10 Holding mount
11 Side wall
12 Outer contour
20 Arrangement region
22 Tapered region
24 Widened region
28 Fastening opening
30 Fastening collar
40 Insert part
41 Connecting section
42 Inner section
43 Outer section
44 Reinforcing section
45 Shoulder
46 Recess, opening
60 Load-bearing element, mounting plate, frame part
62 Mounting opening
64 Web/collar 66 Gap
80 Strut
H Vertical axis
F Driving direction

The invention claimed is:

1. A holding mount for a commercial vehicle trailer, comprising:
    a load-bearing element;
    two side walls which extend substantially along a vertical axis, the two side walls including a connection portion configured to connect the two side walls to the load-bearing element; and
    an insert part which has a connecting section and a reinforcing section, the connecting section having a planar portion configured to connect to the load-bearing element, the reinforcing section extending between and reinforcing the side walls, the connecting section having an inner section which extends between the side walls proximate the load-bearing element and an outer section which bears against the side walls proximate the load-bearing element, wherein the connection portion of the side walls is received within a mounting opening of the load-bearing element.

2. The holding mount as claimed in claim 1, the outer section closing an outer contour of the side walls.

3. The holding mount as claimed in claim 1, the outer section and the inner section of the insert part being connected above a shoulder, a size of the shoulder corresponding substantially to a wall thickness of at least one of the side walls.

4. The holding mount as claimed in claim 1, the reinforcing section extending substantially parallel to the vertical axis.

5. The holding mount as claimed in claim 4, the connecting section extending substantially perpendicularly with respect to the vertical axis.

6. The holding mount as claimed in claim 1, the connecting section extending substantially perpendicularly with respect to the vertical axis.

7. The holding mount as claimed in claim 1, wherein a length of the connection section is a length of the connection portion of the side walls and a length of the connection section of the insert part, and wherein a ratio of a length of the connecting section to a sum of the length of the connection section and a length of the connection portion of one of the side walls is in a range of approximately from 0.1 to 0.5.

8. The holding mount as claimed in claim 7, wherein the ratio is within the range of approximately from 0.2 to 0.3.

9. The holding mount as claimed in claim 7, wherein a ratio of a length of the reinforcing section to a length of the connecting section is in a range of approximately from 1.1 to 1.3.

10. The holding mount as claimed in claim 1, wherein a ratio of a length of the reinforcing section to a length of the connecting section is in a range of approximately from 1.1 to 1.3.

11. The holding mount as claimed in claim 1,
    wherein a distance between the two walls increases along a vertical axis away from the load-bearing element to form a narrowed portion and a widened portion, and wherein the reinforcement section extends into the widened portion.

12. The holding mount as claimed in claim 11, wherein a ratio of a width of the narrowed portion to the widened portion is within the range of approximately from 0.7 to 0.9.

13. The holding mount as claimed in claim 1, further comprising:
    at least one fastening opening extending through at least one of the two side walls and arranged below the inner section.

14. The holding mount as claimed in claim 1, the insert part having at least one recess or opening.

15. A holding system, comprising:
    a holding mount which includes a load-bearing element and two side walls, where the two side walls extend substantially along a vertical axis, and which a connection portion which is connected to the load-bearing element; and
    an insert part which has a connecting section and a reinforcing section, the connecting section including a planar portion connected to the load-bearing element, the reinforcing section extending between and reinforcing the side walls along the vertical axis, the load-bearing element having a mounting opening which configures a collar, and the connection portion of the two side walls being arranged or fastened within the collar.

16. The holding system as claimed in claim 15, the load-bearing element being a frame structure or a part of a frame structure of a vehicle, or a mounting plate.

17. The holding system as claimed in claim 15, wherein a circumferential, closed gap is located between the collar and the arrangement region.

* * * * *